Aug. 7, 1945.  G. E. STEINEL  2,381,383
METHOD OF PROOFING TUBES
Filed Aug. 23, 1941
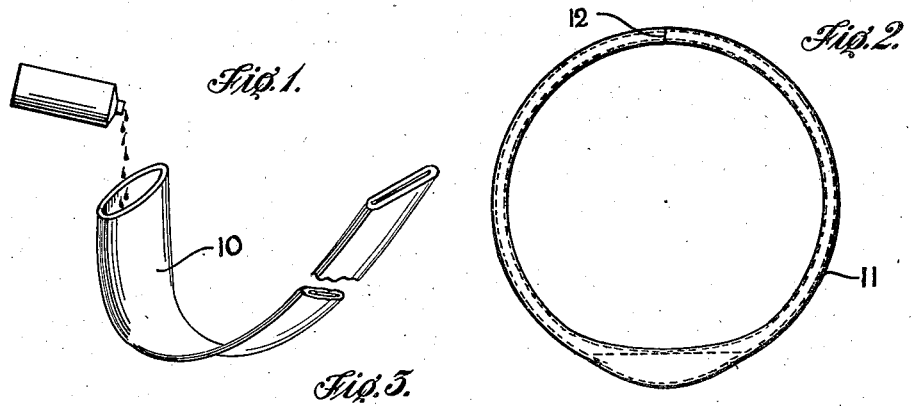
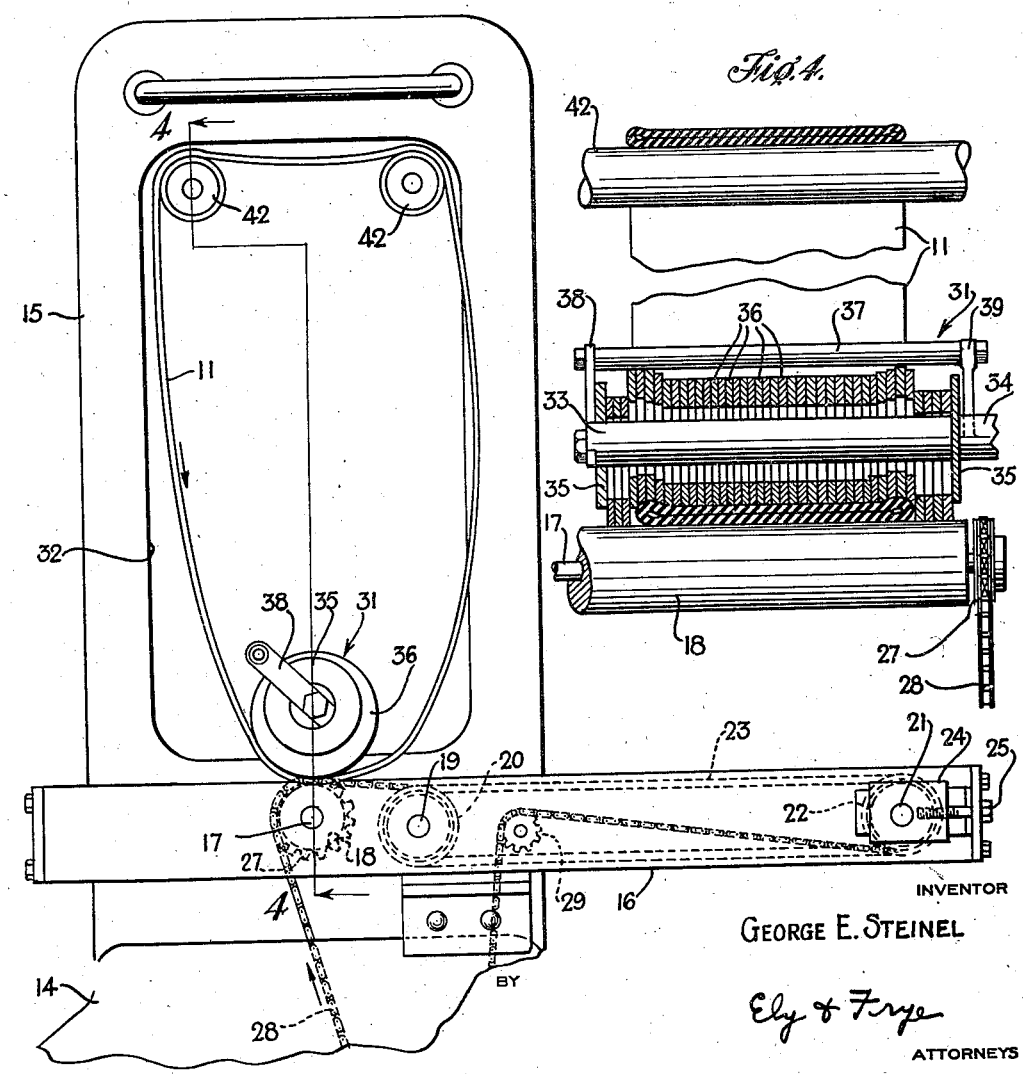
INVENTOR
GEORGE E. STEINEL
BY Ely & Frye
ATTORNEYS Patented Aug. 7, 1945

2,381,383

UNITED STATES PATENT OFFICE 2,381,383

METHOD OF PROOFING TUBES

George E. Steinel, Barberton, Ohio, assignor to The Firestone Tire & Rubber Company, Akron, Ohio, a corporation of Ohio Application August 23, 1941, Serial No. 408,127

2 Claims. (Cl. 154—15)

This invention relates to methods of proofing tubes, and more especially it relates to improved procedure for applying proofing composition to the interior surface of endless rubber tubes.

This invention is of primary utility in the rubber industry for the manufacture of rubber inner tubes of the "leakproof" type. An inner tube of the character mentioned has its interior surface treated with proofing composition to prevent the diffusion of air through its rubber structure. In the manufacture of such tubes a definite quantity of the proofing composition, in thin viscous form, is placed within the unvulcanized rubber tubing before the ends thereof are spliced together to produce endless form. After the tube is spliced, but before subsequent operations are performed thereon, the tube requires to be treated to effect even distribution of the proofing composition upon the entire interior surface of the tube and it is to the performing of this operation that this invention primarily is directed.

The chief object of the invention is to effect an even distribution of the proofing composition. More specifically, the invention aims to apply pressure to the tube progressively and evenly to all parts of the tube notwithstanding variations in the transverse thickness of the tube. Another object is to assure that proofing composition will cover the splice of an endless rubber tube. Other objects will be manifest as the description proceeds.

Of the accompanying drawing:

Fig. 1 is a perspective view of one end portion of a rubber tube showing proofing composition being placed therein;

Fig. 2 is an elevation of the tube after it has been spliced to endless form with the proofing composition therein;

Fig. 3 is a front elevation of apparatus for progressively applying pressure to the endless tube in a circumferential direction; and Fig. 4 is a section on the line 4—4 of Fig. 3.

The improved method constituting the invention may be stated as follows: The material from which the inner tubes are made is extruded, in plastic unvulcanized form, in a continuous strip, which strip is a flattened tube. As the strip is produced it is transversely severed into shorter units, each of the proper length to produce an individual inner tube, such a unit being shown at 10, Fig. 1. Next, an operator holds open one end of the tube unit 10, and pours or injects a determinate quantity of proofing composition into the interior thereof, which operation is conventionally shown in Fig. 1. Immediately thereafter the operator joins the two ends of the tube unit by a lapped or butt splice to produce an endless tube structure 11, Fig. 2, having a closed internal chamber in which the proofing composition is contained, the splice being shown at 12 in said figure. Thereafter the flattened tube is subjected to rolling pressure circumferentially thereof, said pressure being applied uniformly to the tube transversely thereof. Said pressure serves to force the viscous proofing composition in the tube to spread evenly over the entire interior surface of the tube, progressively around the latter. This completes the proofing operation, so that thereafter a valve stem may be mounted in the tube and the latter vulcanized by heat and pressure in the usual manner.

Attention now is directed to Fig. 3 and Fig. 4 of the drawing wherein is shown apparatus that may be employed for carrying out the tube-pressing operation of the previously described method. Said apparatus comprises a lower housing structure 14, and an upper housing structure 15 of somewhat smaller size superposed thereon. Mounted upon the front wall of the upper housing 15, and projecting forwardly and laterally therefrom is an overhanging frame 16 of rectangular shape. Journaled in the front and rear members of the frame 16 is a driven horizontal shaft 17, which shaft has a roller 18 fixed thereon, said shaft being disposed in the central fore-and-aft plane of the upper housing, the roller 18 constituting one of the presser rollers of the apparatus. Journaled in the frame 16, parallel to the shaft 17 and a little to the right thereof as viewed from the front of the apparatus, is an idler shaft 19 upon which is mounted a plurality of axially spaced apart peripherally grooved sheaves, such as the sheave 20. At the extreme right end of the frame 16 is a driven shaft 21 upon which is mounted a plurality of sheaves, such as the sheave 22, which sheaves are in alignment with the sheaves 20 aforementioned, each pair of sheaves 20, 22 supporting an endless conveyor belt 23 of narrow width. The shaft 21 is journaled at its opposite ends in respective journal blocks 24 that are slidably mounted in the frame 16, at the right hand end thereof. The blocks 24 are adjustable longitudinally of the frame by means of respective adjusting screws 25, the arrangement enabling the belts 23 to be maintained at the desired tautness.

Upon the end of shaft 17 nearest the upper housing 15 is a sprocket 27, Fig. 4, and a similar sprocket (not shown) is mounted upon the end of shaft 21. Trained about said sprockets is a sprocket chain 28 for driving the same and the shafts 17, 22, the lower reach of the sprocket chain having driving engagement with suitable driving means, such as an electric motor (not shown). The lower reach of said sprocket chain 28 also is trained about an adjustable idler sprocket 29 by means of which the chain may be maintained in taut condition. The chain 28 is driven in the direction indicated by the arrow in Fig. 3, the arrangement being such as to effect the concurrent driving of the roller 18 and the conveyor belts 23, the upper or work-receiving reaches of the latter moving toward the right as viewed in Fig. 3 whereby work pieces deposited thereon will be conveyed to the right hand end of the frame 16 and dropped off the end thereof. Any suitable conveying means (not shown) may be provided thereat for receiving the work pieces and for delivering them to any desired destination for further processing.

Adapted to cooperate with the driven roller 18 for effecting the progressive pressing of the work is a presser roller that is designated as a whole by the numeral 31, and which commonly is known as a contour roller. This roller has a horizontal operative position over the roller 18 and parallel thereto, as shown in Figs. 3 and 4, and has a vertical inoperative position (not shown) in which it is positioned within the upper housing 15, the latter having a large opening 32 in its front wall that enables the roller to move therethrough. Said contour roller 31 comprises a non-rotatable bar or rod 33 that is mounted at one end in a bracket 34, the latter being pivotally mounted in a supporting structure (not shown) disposed within the upper housing 15. The rod 33 carries end plates 35, 35 between which are mounted on the rod a plurality of discs or washers 36, 36, each of which has an axial aperture substantially larger than the rod so that the discs are capable of movement to eccentric positions relatively of the rod, as well as rotary movement about the rod. A guard member 37 supported at one end by an arm 38 secured to the free end of the rod 33 and at the other end by an arm 39 formed on bracket 34 is provided for limiting the eccentric positions of the discs in one direction. Means (not shown) is connected to the bracket 34 for swinging the contour roller between the operative and the inoperative positions aforementioned.

The construction of the contour roller 31 is such that when it is lowered upon a work piece, such as the endless unvulcanized rubber tube structure 11, the roller will exert uniform pressure on a transverse region of the tube notwithstanding the irregular thickness of the flattened tube due to the folded margins thereof. This result is achieved by the feature of loose journaling of the discs 36 on the rod 33 which enables said discs to assume independent positions eccentrically of said rod. The pressure upon the work consists solely of the weight of the discs 36, which press the tube against the driven roller 18 to feed the tube longitudinally in the direction indicated by the arrow in Fig. 3.

For supporting the endless tube 11 in an open loop while it is being progressively pressed, as shown, a pair of idler supporting rollers 42, 42 is provided. Said rollers are in parallel, spaced apart relation, and have a horizontal operative position somewhat above the contour roller 31, as shown in Figs. 3 and 4, and have a vertical inoperative position (not shown) within the upper housing 15, the opening 32 in the front wall of the housing enabling the rollers to be moved thereinto. To this end the rollers are pivotally mounted at their rear ends within the housing, and suitable means (not shown) is provided for swinging said rollers in unison about their pivots. The rollers 42 are so positioned with relation to the contour roller 31 that when they are in their lowered, inoperative position they will be disposed on opposite sides of the contour roller when the latter is in its elevated inoperative position.

The operation of the apparatus is as follows: In their inoperative position the idler rollers 42 are in horizontal position and the contour roller 37 is in elevated or vertical position. The operator first mounts the endless rubber tube 11, with proofing composition therein, upon the idler rollers 42, the lowermost portion of the depending tube resting upon the driving roller 18. As soon as the work is properly positioned as described, the operator actuates the proper instrumentalities to lower the contour roller 31 and to start the driving of the sprocket chain 28, the latter thereby driving the conveyor belts 23 and the roller 18. Due to the pressure of the contour roller 31 upon the tube 11, the latter is pressed into frictional driving engagement with the driven roller 18 and impelled longitudinally by the latter. The pressure of the roller 31 also flattens the tube 11 transversely thereof, as shown in Fig. 4, and forces opposite sides thereof locally into face to face contact with each other, thus forcing the viscous proofing composition in the tube to be spread over the interior surface thereof, progressively about the entire tube. This phase of operation continues until every part of the tube has passed between the rollers 18, 31 at least twice. Thereafter the contour roller 31 rises from the work and assumes its inoperative vertical position, and then the idler rollers 42 move to their inoperative vertical position, during which movement their free ends move downwardly. This enables work unit 11 to fall therefrom onto the rotating drive roller 18 and conveyor belts 23, the latter carrying the work to the far end of the frame 16 where it drops from the apparatus. The idler rollers move back to operative horizontal position before the apparatus ceases operation.

The invention results in the uniform distribution of viscous proofing composition throughout the interior of the work, and achieves the other objects set out in the foregoing statement of objects.

Modification may be resorted to without departing from the spirit of the invention, or the scope thereof as defined by the appended claims.

What is claimed is:

1. The method of making inner tubes which comprises placing a determinate quantity of viscous proofing composition within a length of unvulcanized rubber tubing, joining the ends of the tube by splicing to produce an endless tube having a closed internal chamber in which the proofing composition is contained, evenly distributing the proofing composition over the interior of the tube, mounting a valve stem in the tube, and thereafter vulcanizing the rubber of the tube.

2. The method of making inner tubes which comprises placing a determinate quantity of proofing composition within a length of unvulcanized rubber tubing, splicing the ends of the tube to make it endless and provide a closed internal chamber in which the proofing composition is contained, impelling the tube circumferentially and applying rolling pressure thereto in a local region of its path of movement to distribute the proofing composition evenly over the entire interior surface of the tube, mounting a valve stem in the tube, and thereafter vulcanizing the rubber of the tube.

GEORGE E. STEINEL.